(12) United States Patent
Lech et al.

(10) Patent No.: US 6,398,227 B1
(45) Date of Patent: Jun. 4, 2002

(54) RIDE CONTROL APPARATUS AND METHOD

(75) Inventors: Richard J. Lech, Burlington, IA (US); Alan D. Berger, Winfield; Danley C. K. Chan, Chicago, both of IL (US); Dennis J. Heyne, Burlington, IA (US)

(73) Assignee: Case Corp., Racine, WI (US)

( * ) Notice: Subject to any disclaimer, the term of this patent is extended or adjusted under 35 U.S.C. 154(b) by 0 days.

(21) Appl. No.: 09/687,327

(22) Filed: Oct. 13, 2000

(51) Int. Cl.[7] .............................................. B60G 17/00
(52) U.S. Cl. .................. 280/5.515; 280/5.5; 280/5.514; 280/6.159
(58) Field of Search .............................. 280/5.5, 5.514, 280/5.515, 6.519, 124.157

(56) References Cited

U.S. PATENT DOCUMENTS

| | | | | |
|---|---|---|---|---|
| 4,279,319 A | * | 7/1981 | Joyce, Jr. ...................... | 180/12 |
| 4,634,142 A | * | 1/1987 | Woods et al. ................ | 280/707 |
| 4,826,206 A | * | 5/1989 | Immega ....................... | 280/711 |
| 4,900,056 A | * | 2/1990 | Fukushima et al. .......... | 280/708 |
| 4,913,457 A | * | 4/1990 | Hafner et al. ................ | 280/707 |
| 5,052,712 A | * | 10/1991 | Raidel ......................... | 280/702 |
| 5,239,471 A | * | 8/1993 | Takahashi ............... | 364/424.05 |
| 5,289,379 A | * | 2/1994 | Williams ............... | 364/424.05 |
| 5,299,488 A | * | 4/1994 | Kadlicko et al. ............. | 91/363 |
| 5,342,023 A | * | 8/1994 | Kuriki et al. ............. | 267/64.17 |
| 5,348,338 A | * | 9/1994 | Kuriki et al. ............... | 280/707 |
| 5,390,948 A | * | 2/1995 | Kuriki et al. ............... | 280/707 |
| 5,410,482 A | * | 4/1995 | Kimura et al. ......... | 364/424.05 |
| 5,466,007 A | * | 11/1995 | Smith ......................... | 280/840 |
| 5,517,847 A | * | 5/1996 | Campbell et al. .......... | 73/11.07 |
| 5,619,413 A | * | 4/1997 | Oakley ................ | 364/424.046 |
| 5,999,868 A | * | 12/1999 | Beno et al. .................... | 701/37 |

* cited by examiner

Primary Examiner—Brian L. Johnson
Assistant Examiner—Deanna Draper
(74) Attorney, Agent, or Firm—A. N. Trausch

(57) ABSTRACT

An apparatus for adjusting the ride of a load carrying vehicle is disclosed. The apparatus includes a sensor, a controller, and an adjustable accumulator assembly. The sensor measures a load on a load holding hydraulic circuit. The controller is operatively connected to the adjustable accumulator assembly. The controller is capable of adjusting the precharge pressure in the accumulator in response to the load measured by the sensor.

22 Claims, 3 Drawing Sheets

RIDE CONTROL APPARATUS AND METHOD

FIELD OF THE INVENTION

This invention relates generally to the field of ride control systems and, in particular, to an apparatus and method for automatically adjusting the ride of a loader type vehicle.

BACKGROUND OF THE INVENTION

When a loader vehicle such as, for example, a wheel loader, a backhoe loader, a skid steer loader or forklift machine travels across bumps or other obstacles, the resultant energy is transferred to the vehicle which may cause it to bounce. This may cause the spillage of an object or material carried by the loader vehicle. Moreover, excessive bouncing may result in an excessive amount of wear and tear on the loader vehicle, and an unacceptably harsh ride for the operator.

Attempts have been made to provide improved ride performance for these types of loader vehicles by using the weight of the load carrying structure of the vehicle to dampen the ride. In particular, these ride control systems typically route the hydraulic pressure generated by the load carrying structure to a hydraulic accumulator. When the loader vehicle travels over a bump, for example, the accumulator absorbs the increased hydraulic pressure thereby improving the ride of the vehicle. However, these accumulators are typically sized with an initial gas charge that is selected to provide an optimum ride for only one load. Moreover, the gas charge in these accumulators cannot be automatically adjusted to a level that is optimum for the specific load being carried. As a result, only one specific load will result in the optimum performance of the ride control system. Although these accumulators may provide some benefit when loads are higher or lower than the optimum, they do not automatically adjust to provide optimum ride performance for varying loads.

Accordingly, it would be desirable to have an apparatus and method for automatically controlling the ride of loader type vehicles that overcomes the disadvantages described above.

SUMMARY OF THE INVENTION

One aspect of the invention provides an apparatus for adjusting the ride of a load carrying vehicle. The apparatus includes a sensor, a controller, and an adjustable accumulator assembly. The sensor measures a load on a load holding hydraulic circuit. The controller is operatively connected to the adjustable accumulator assembly. The controller is capable of adjusting the pressure in the accumulator in response to the load measured by the sensor.

Another aspect of the invention provides a method for adjusting the ride of a loader vehicle. An accumulator assembly including a first accumulator operatively connected to a second accumulator by a valve is provided. The first and second accumulators each include a gas chamber, a fluid chamber, and a piston that separates that gas chamber and the fluid chamber. A hydraulic load holding circuit is operatively connected to the second accumulator. Pressure on the hydraulic load holding circuit is sensed and a load on the hydraulic load holding circuit is determined from the sensed pressure. A desired pressure for the gas chamber of the second accumulator is determined. A desired precharge number of gas molecules for the gas chamber of the second accumulator is also determined. The hydraulic load holding circuit is isolated from the fluid chamber of the second accumulator. The valve is opened. The position of the piston of the first accumulator and the position of the piston of the second accumulator are determined. A desired position of the piston of the first accumulator that is optimum for the load on the hydraulic load holding circuit is determined. The position of the piston of the first accumulator is adjusted until the desired position is reached. The valve is closed, and the hydraulic load holding circuit is connected to the fluid chamber of the second accumulator. The position of the piston of the first accumulator and the position of the piston of the second accumulator may preferably be monitored.

Another aspect of the invention provides a method for adjusting the ride of a loader vehicle. An accumulator assembly including a first accumulator operatively connected to a second accumulator by a valve is provided. The first and second accumulators each include a gas chamber, a fluid chamber, and a piston that separates that gas chamber and the fluid chamber, a hydraulic load holding circuit operatively connected to the second accumulator. Pressure on the hydraulic load holding circuit is sensed and a load on the hydraulic load holding circuit is determined from the sensed pressure. A desired precharge pressure for the gas chamber of the second accumulator is determined. A desired number of gas molecules for the gas chamber of the second accumulator is then determined. The hydraulic load holding circuit is isolated from the fluid chamber of the second accumulator. The valve is opened, and the position of the piston of the first accumulator is determined. The pressure in the gas chamber of the second accumulator is determined. The position of the piston of the second accumulator is also determined. A desired position of the piston of the first accumulator that is optimum for the load on the hydraulic load holding circuit is also determined.

The position of the piston of the first accumulator is adjusted until the desired position is reached. The valve is closed and the hydraulic load holding circuit is connected to the fluid chamber of the second accumulator.

Another aspect of the invention provides a method for adjusting the ride of a loader vehicle. An accumulator assembly including a first accumulator operatively connected to a second accumulator by a valve is provided. The first and second accumulators each include a gas chamber, a fluid chamber, and a piston that separates that gas chamber and the fluid chamber. A hydraulic load holding circuit is operatively connected to the second accumulator. Pressure on a hydraulic load holding circuit is sensed and a load on the hydraulic load holding circuit is determined from the sensed pressure. A desired precharge pressure for the gas chamber of the second accumulator is determined. The hydraulic load holding circuit is isolated from the fluid chamber of the second accumulator. The valve is opened, and the position of the piston of the first accumulator is adjusted until the desired position is reached. The valve is closed and the hydraulic load holding circuit is connected to the fluid chamber of the second accumulator. Fluid is prevented from flowing between the fluid chamber of the second accumulator and the tank. The pressure in the gas chamber of the second accumulator may preferably be monitored.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DETAILED DESCRIPTION OF THE PRESENTLY PREFERRED EMBODIMENTS

Figure 1:
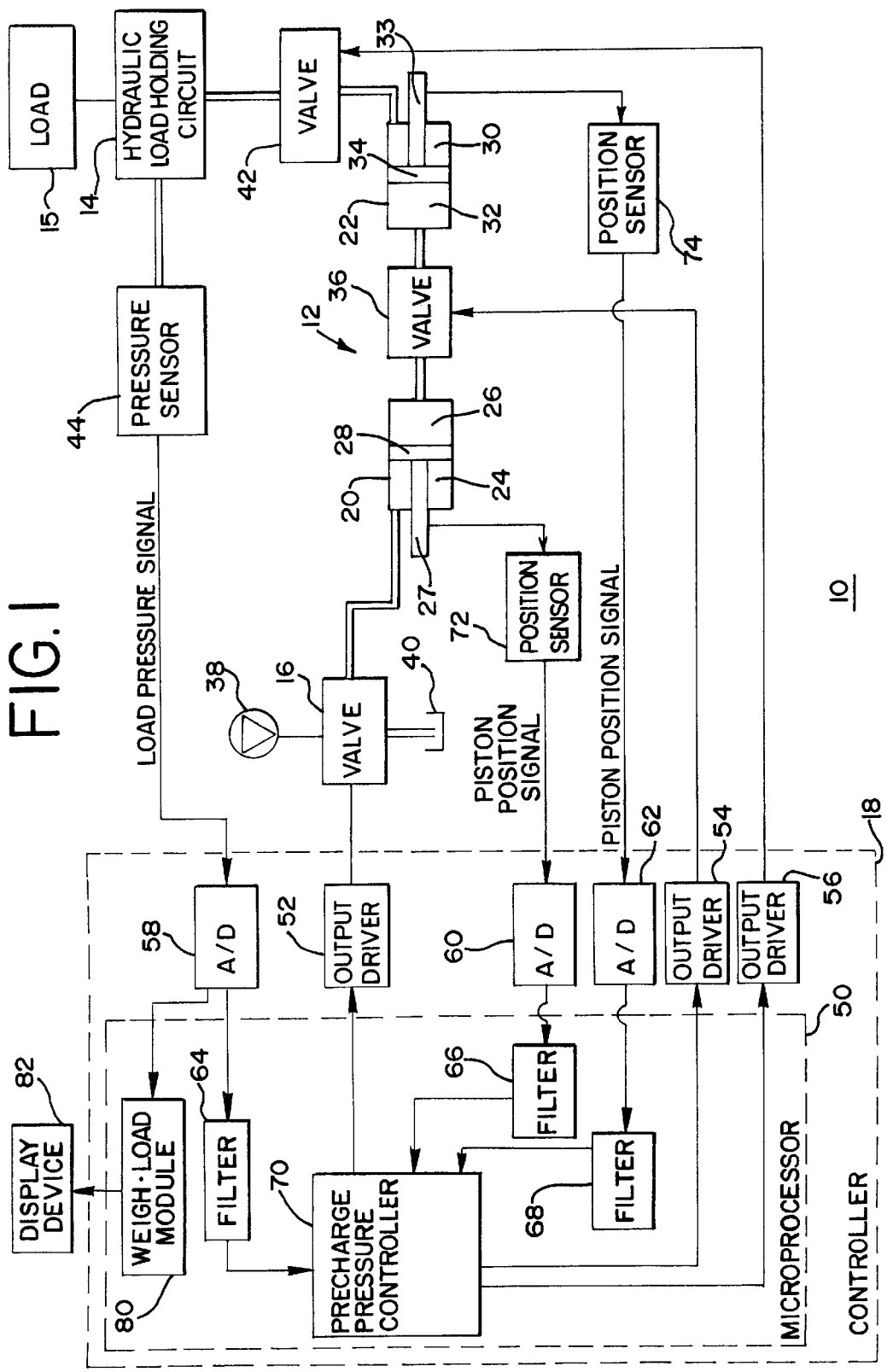
FIG. 1 is a block diagram of a preferred embodiment of an apparatus for automatically adjusting the ride of a loader type vehicle which is made in accordance with the invention.

As shown in FIG. 1, an apparatus 10 for controlling the ride of a loader vehicle includes an accumulator assembly 12 having a pressure operatively connected to a hydraulic load holding circuit 14, a first valve 16 operatively connected to the accumulator assembly 12, and a controller 18 operatively connected to the first valve 16. The controller 18 determines a load 15 on the hydraulic load holding circuit 14 and automatically adjusts the precharge pressure in the accumulator assembly 12 to a level that is optimum for the load 15. The apparatus 10 therefore provides optimum shock absorption for varying loads on the hydraulic load holding circuit 14. It is contemplated that the apparatus 10 may be used in any type of loader vehicle that carries a load that is supported by hydraulic fluid pressure. The loader vehicle may be, for example, a wheel loader, a skid steer loader, a backhoe loader or a forklift machine.

As shown in FIG. 1, the accumulator assembly 12 may preferably include a first accumulator 20 operatively connected to a second accumulator 22. In the embodiment shown, the hydraulic load holding circuit 14 is operatively connected to the second accumulator 22, and the first valve 16 is operatively connected to the first accumulator 20. The first accumulator 20 includes a fluid chamber 24 for receiving hydraulic fluid, a gas chamber 26 for receiving gas, and a slidable piston 28 which separates the fluid chamber 24 and the gas chamber 26. The second accumulator 22 also includes a fluid chamber 30 for receiving hydraulic fluid, a gas chamber 32 for receiving gas, and a slidable piston 34 which separates the fluid chamber 30 and the gas chamber 32. In the embodiment shown, the gas chamber 26 of the first accumulator 20 is linked to the gas chamber 32 of the second accumulator 22 by a second valve 36. The second valve 36 may preferably be any conventional shutoff valve. The gas chambers 26, 32 of the first and second accumulators 20, 22 may preferably be initially charged with a gas such as, for example, nitrogen, to a precharge pressure which represents the initial charge in the gas chamber with the gas side of the accumulator at a maximum volume. The first and second accumulators 20, 22 may be initially gas charged with both pistons 28, 34 in the outermost position. The first and second accumulators 20, 22 may be any of the commercially available hydraulic accumulators such as, for example, those manufactured by Parker Hannifin Corp., Hydraulic Accumulator Division.

The hydraulic load holding circuit 14 may be any conventional hydraulic circuit that includes conventional hydraulic components for holding a load 15. The conventional hydraulic components may include, for example, a reservoir of hydraulic fluid, hydraulic pumps, valves, lift cylinders, and hydraulic lines. As shown in FIG. 1, the hydraulic load holding circuit 14 is operatively connected to the load 15. The load 15 is defined herein as the weight of a load carrying structure and the weight of any material contained in, or supported by, the load carrying structure. For example, with respect to wheel loaders, skid steer loaders, and backhoe loaders, the load 15 may consist of the weight of the loader arm, the weight of a bucket, and the weight of any material that is in the bucket. With respect to forklift machines, for example, the load 15 may consist of the weight of the forks and the weight of any object or material supported by the forks.

As shown in FIG. 1, the first valve 16 may preferably be operatively connected between the fluid chamber 24 of tile first accumulator 20 and the controller 18. The valve 16 may be any of the commercially assailable electronically controlled valves suitable for regulating the flow of hydraulic fluid such as, for example, a three-position on/off solenoid valve. The first valve 16 may also preferably be operatively connected to a pump 38 and to a tank 40. A third valve 42 may preferably be operatively connected between the fluid chamber 30 of the second accumulator 22 and the hydraulic load holding circuit 14. As with valve 16, the valve 42 may be any of the commercially available electronically controlled valves suitable for regulating the flow of hydraulic fluid such as, for example, a two or three position on/off or proportional solenoid valve. A first pressure sensor 44 is operatively connected between the hydraulic load holdings, circuit 14 and the controller 18 and is in communication with the hydraulic load holding circuit 14. In particular, the pressure sensor 44 may preferably be in communication with the piston side of conventional lift cylinders in the hydraulic load holding circuit 14. The function of the pressure sensor 44 is to sense the pressure in the hydraulic load holding circuit 14 created by the load 15. The pressure sensor 44 generates a load pressure signal that is processed by the controller 18 as more fully described below. The pressure sensor 44 may be any of the commercially available pressure transducers. The load pressure signal may be generated by other conventional means such as, for example, load cells that are in communication with the hydraulic load holding circuit 14.

The controller 18 may preferably include a microprocessor 50, a plurality of conventional output drivers 52, 54, 56, and a plurality of conventional analog-to-digital converters 58, 60, 62. The number of output drivers and analog-to-digital converters may vary depending upon the particular application. Each of the output drivers 52, 54, 56 may preferably be any conventional bi-directional solenoid valve driver such as, for example, relays, a field effect transistors (FET), or bipolar transistors. The output drivers 52, 54, 56 accept valve commands from the microprocessor 50 and control the operation of the valves 16, 36, 42. The microprocessor 50 may be any of the commercially available microprocessors such as, for example, an Intel 80196CB or Motorola 68376. In the embodiment shown, the microprocessor 50 preferably executes software or firmware that functionally provides a plurality of conventional filters 64, 66, 68 and a pressure controller 70. Each of the filters 64, 66.68 may preferably be a low pass filter having a relatively low cut-off frequency that is below the dynamics of the loader vehicle such as, for example, 1 Hz. The filters 64, 66, 68 remove any dynamic element that may be present in the signals. Alternatively, the filters 64, 66, 68 and the pressure controller 70 may be comprised of discrete circuits which may be operatively connected to the microprocessor 50.

In operation, the controller 18 issues valve commands to the first valve 16 in order to vary the position of the piston 28 inside the first accumulator 20. The movement of the piston 28 (when valve 36 is open and piston 34 is locked in place) either increases or decreases the number of gas molecules inside of the gas chamber 32 of the second accumulator 22. As a result, the precharge pressure in the gas chamber 32 can be adjusted to adapt to different loads on the hydraulic load holding circuit 14. It is contemplated that a number of different hardware configurations and algorithms may be implemented to adjust the precharge pressure in the gas chamber 32 of the second accumulator 22 to provide optimum shock absorption for varying loads.

For example, in the embodiment shown in FIG. 1, a first position sensor 72 is operatively connected between the piston 28 of the first accumulator 20 and the controller 18. In particular, the first position sensor 72 may preferably be attached or operatively positioned in relationship to the first accumulator 20 to sense the position of the piston 28. Similarly, a second position sensor 74 may preferably be attached or operatively positioned in relationship to the second accumulator 22 to sense the position of the piston 34. Each of the position sensors 72, 74 may preferably be any of the commercially available position sensors such as, for example, a linear potentiometer or a linear variable displacement transducer (LVDT). As shown in FIG. 1, the position sensor 72 may preferably be attached to a stroking element of the first accumulator 20 such as, for example, a rod 27 which in turn is connected to the piston 28. Similarly, the position sensor 74 may preferably be attached to a stroking element of the second accumulator 22 such as, for example, a rod 33 which in turn is connected to the piston 34. The position sensors 72, 74 sense the position of the pistons 28, 34, respectively.

In operation, the pressure sensor 44 measures the pressure on the hydraulic load holding circuit 14 created by the load 15, and generates an analog load pressure signal. The load pressure signal may contain both static and dynamic elements. The static element is related to the load 15, while the dynamic element is related to the motion of the loader vehicle. The load pressure signal is converted to a digital signal by the analog-to-digital converter 58 in the controller 18, and is processed by the microprocessor 50. In the embodiment shown in FIG. 1, the digital load pressure signal is then directed to the filter 64, which removes the dynamic element of the signal. The filtered signal represents an estimate of the load 15.

The pressure controller 70 computes the desired precharge pressure for the gas chamber 32 of the second accumulator 22 based upon the measured pressure on the hydraulic load holding circuit 14. This desired precharge pressure may preferably be derived from the established relationship between the load (weight) on the hydraulic load holding circuit 14 and the ideal precharge pressure for the gas chamber 32. The pressure controller 70 computes the desired number of gas molecules for gas chamber 32 based on the desired precharge pressure and the Gas Law (PV=NRT).

The hydraulic load holding circuit 14 is then isolated from the fluid chamber 30 of the second accumulator 22. This is accomplished by pressure controller 70, which issues a valve command via output driver 56 which causes the valve 42 to close. When the valve 42 is closed, the piston 34 is locked in place. The valve 36 is opened to achieve gas flow equilibrium between the gas chamber 26 and gas chamber 32. The pressure controller 70 accomplishes this by issuing a valve command via output driver 54 that causes the valve 36 to open. The position sensors 72, 74 measure the linear positions of the pistons 28, 34, respectively (e.g. via the rods 27, 33 attached to the pistons 28, 34). Each of the position sensors 72, 74 generate analog piston position signals. The analog piston position signal generated by position sensor 72 is converted into a digital signal by the analog-to-digital converter 60. Similarly, the analog piston position signal generated by position sensor 74 is converted into a digital signal by the analog-to-digital converter 62. The digital piston position signals are then processed by the microprocessor 50. In particular, the digital piston position signals are filtered by the filters 66, 68 and are processed by the pressure controller 70. Based on the positions of the pistons 28, 34, the pressure controller 70 computes the desired position of piston 28 required to achieve the desired number of gas molecules in the gas chamber 32. The pressure controller 70 issues a valve command to the valve 16 via output driver 52 to adjust the position of the piston 28 to the desired position. If the desired position of the piston 28 is in a direction toward the gas chamber 26, hydraulic fluid flows through the valve 16 to the fluid chamber 24 of the first accumulator 20 which causes the piston 28 to move toward gas chamber 26 which increases the gas pressure in the gas chamber 32 of the second accumulator 22. If the desired position of the piston 28 is in a direction away from the gas chamber 26, hydraulic fluid flows out of the fluid chamber 26 which causes the piston 28 to move in a direction away from the gas chamber 26 which decreases the gas pressure in the gas chamber 32 of the second accumulator 22. It is contemplated that other means may be used to position the piston 28 such as, for example, electrically driven screw threads. It is also contemplated that during this process the hydraulic fluid in the fluid chamber 30 is incompressible at all times. The pressure controller 70 monitors the position of the piston 28. When the piston 28 reaches the desired position, the pressure controller 70 issues a valve command via output driver(54 to close the valve 36. The fluid chamber 30 of the second accumulator 22 is reconnected to the hydraulic load holding circuit 14. In particular, the pressure controller 70 issues a valve command via output driver 56 to open the valve 42.

Figure 2:
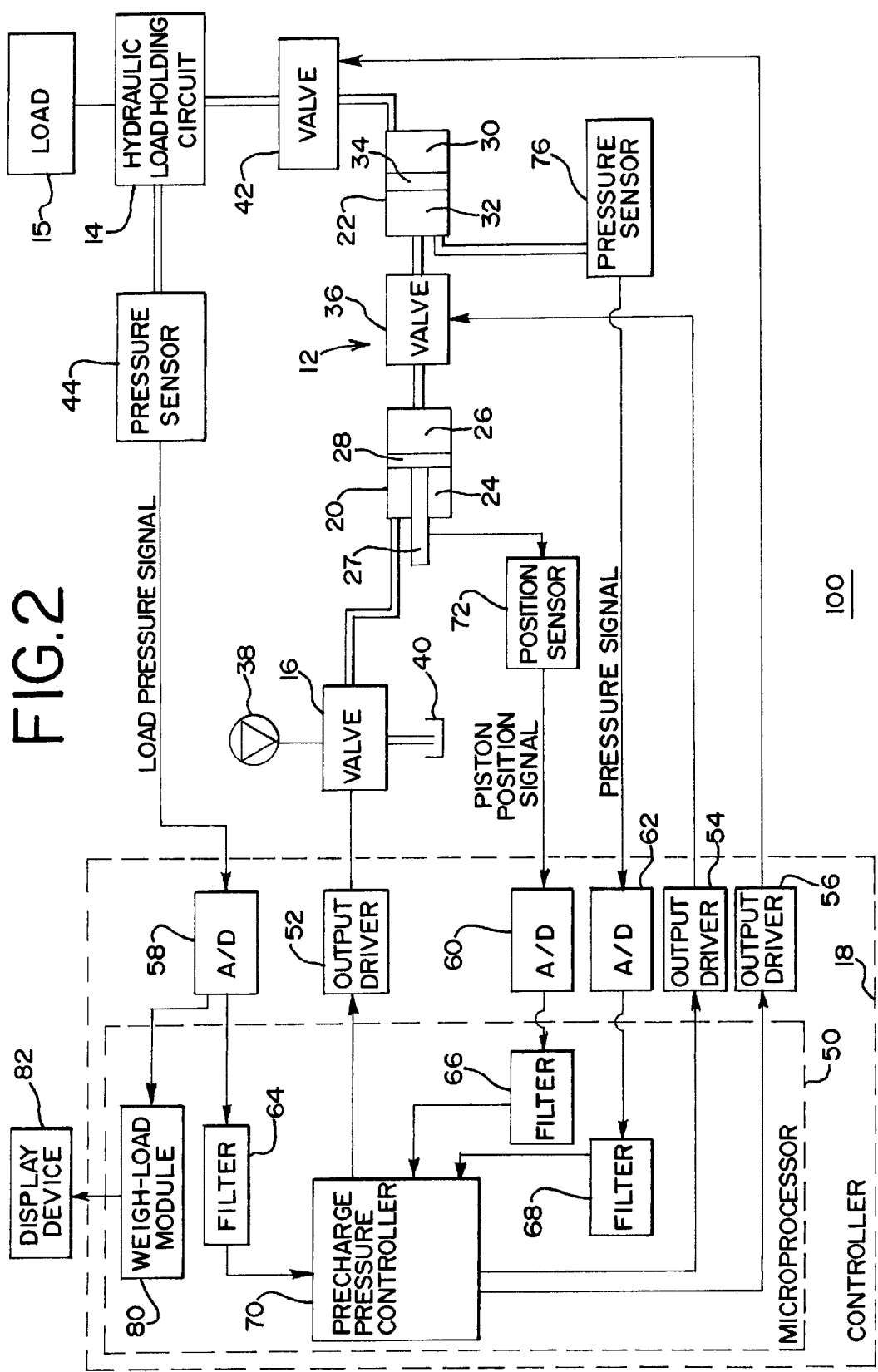
FIG. 2 is a block diagram of an alternative preferred embodiment of an apparatus for automatically adjusting the ride of a loader type vehicle which is made in accordance with the invention.

FIG. 2 illustrates an alternative preferred embodiment of an apparatus 100 for adjusting the ride of a loader vehicle. The embodiment shown in FIG. 2 is the same as the embodiment shown in FIG. 1, except that there is no stroking element associated with the second accumulator 22. As a result, there is no position sensor attached or operatively connected to the piston 34 via a stroking element. Instead, a second pressure sensor 76 is operatively connected to the gas chamber 32 of the second accumulator 22. The pressure sensor 76 measures the precharge pressure in the gas chamber 32 and generates a pressure signal, which is processed by the controller 70 as described below.

In operation, the first pressure sensor 44 measures the pressure on the hydraulic load holding circuit 14 created by the load 15, and generates an analog load pressure signal. The analog load pressure signal is converted to a digital signal by the analog-to-digital converter 58 and is filtered by the filter 64. The pressure controller 70 computes the desired precharge pressure for the gas chamber 32 of the second accumulator 22 based upon the measured pressure on the hydraulic load holding circuit 14. This desired precharge pressure may be derived from the established relationship between the load (weight) on the hydraulic load holding circuit 14 and the ideal pressure for the gas chamber 32. The pressure controller 70 computes the desired number of gas molecules for gas chamber 32 based on the desired precharge pressure and the Gas Law (PV=NRT).

The hydraulic load holding circuit 14 is isolated from the fluid chamber 30 of the second accumulator 22. This is accomplished by pressure controller 70, which issues a valve command via output driver 56 which causes the valve 42 to close. When the valve 42 is closed, the piston 34 is locked in place. The valve 36 is opened to achieve gas flow equilibrium between the gas chamber 26 and gas chamber 32. The pressure controller 70 accomplishes this by issuing a valve command via output driver 54 that causes the valve 36 to open. The position sensor 72 measures the linear position of the piston 28 (e.g. via the rod 27 attached to the piston 28) and generates an analog piston position signal. The piston position signal is converted to a digital signal by the analog-to-digital converter 60 and is processed by the microprocessor 50. In the embodiment shown, the digital load pressure signal is filtered by filter 66. The second pressure sensor 76 measures the pressure inside of the gas chamber 32 of the second accumulator 22. The pressure sensor 76 generates an analog pressure signal that is directed to the controller. 18 and is converted to a digital signal by analog-to digital-converter 62. The digital pressure signal is then filtered by filter 68 and directed to the pressure controller 70. The pressure controller 70 computes the position of the piston 34 in the second accumulator 22 using the Gas Law (PV=NRT) based on the position of the piston 28 in the first accumulator 20, the pressure in the gas chambers 26, 32 (they will be at the same pressure since the valve 36 is open), and the total number of gas molecules in the gas chambers 26, 32. The pressure controller 70 then computes the desired position of the piston 28 required to achieve the desired number of gas molecules in the gas chamber 32. The pressure controller 70 monitors the position of the piston 28 and adjusts the position of the piston 28 by issuing a valve command to the valve 16 via output driver 52 until the piston 28 reaches the desired position. The pressure controller 70 issues a valve command via output driver 54 to close the valve 36 to lock in the desired number of gas molecules in the gas chamber 32. The fluid chamber 30 of the second accumulator 22 is reconnected to the hydraulic load holding circuit 14. In particular, the pressure controller 70 issues a valve command via output driver 56 to open the valve 42. The advantage of this arrangement is that there is no need to monitor the position of piston 34 and, therefore, there is no need for a rod and associated linkage to be connected to piston 34. Also, a piston position sensor for piston 34 is no longer needed.

Figure 3:
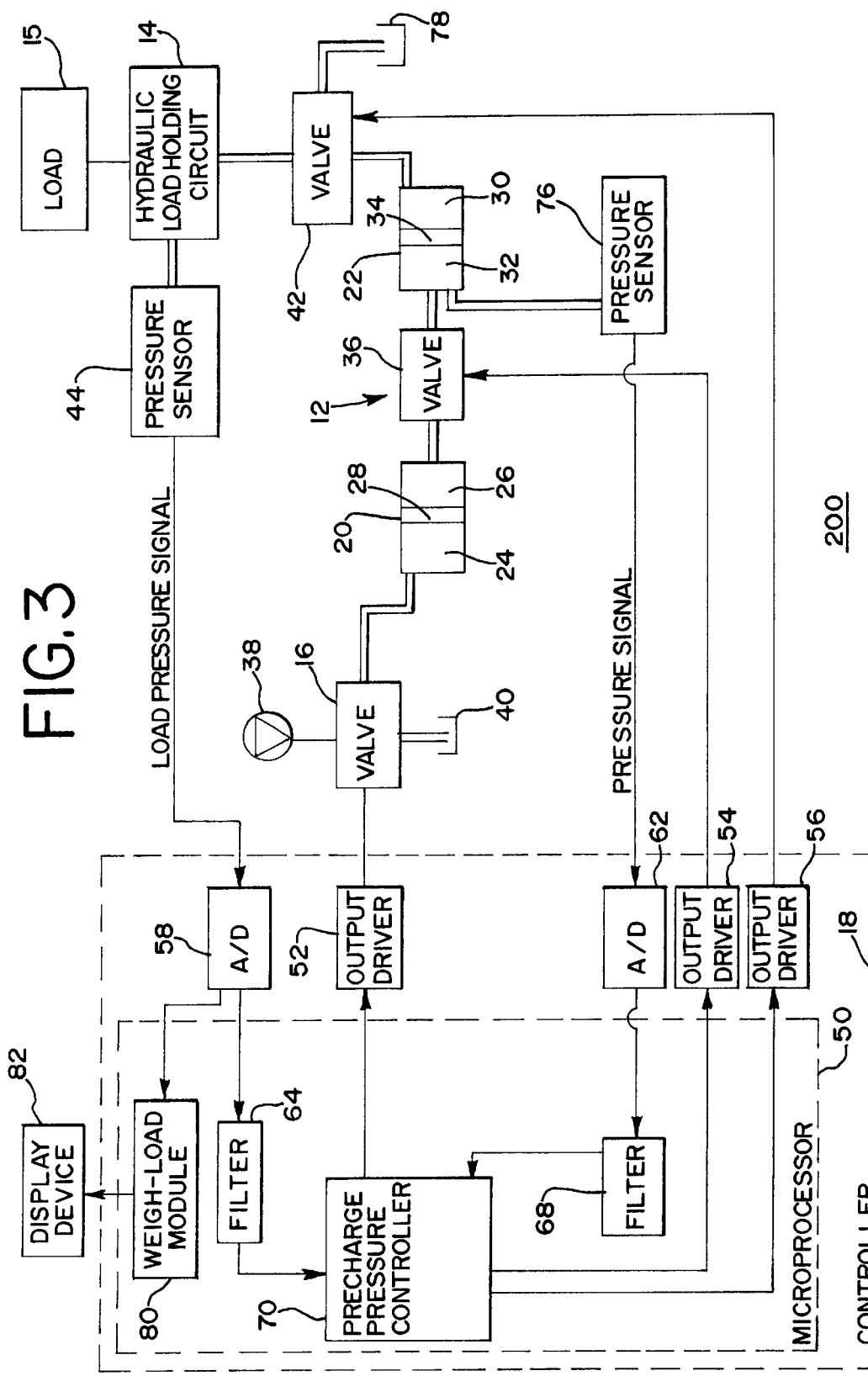
FIG. 3 is a block diagram of an alternative preferred embodiment of an apparatus for automatically adjusting the ride of a loader type vehicle which is made in accordance with the invention.

FIG. 3 illustrates an alternative preferred embodiment of an apparatus 200 for adjusting the ride of a loader vehicle. In the embodiment shown in FIG. 3, there is no stroking element associated with either piston 28 or piston 34. Moreover, there are no piston position sensors operatively connected to either piston 28 or piston 34 via stroking elements. In the embodiment shown in FIG. 3, the second pressure sensor 76 is operatively connected to the gas chamber 32 of the second accumulator 22. The pressure sensor 76 measures the pressure in the gas chamber 32 and generates a pressure signal which is processed by the controller 18.

In operation, the first pressure sensor 44 measures the pressure on the hydraulic load holding circuit 14 created by the load 15, and generates an analog load pressure signal. The analog signal is converted to a digital signal by the analog-to-digital converter 58 and is filtered by the filter 64. The pressure controller 70 computes the desired precharge pressure for the gas chamber 32 based upon the measured pressure on the hydraulic load holding circuit 14. This desired pressure may be derived from the established relationship between the load (weight) on the hydraulic load holding circuit 14 and the ideal precharge pressure for the gas chamber 32.

The hydraulic load holding circuit 14 is isolated from the fluid chamber 30 of the second accumulator 22, and the fluid chamber 30 of the second accumulator 22 is open to the tank 78. This is accomplished by the pressure controller 70, which issues a valve command to the valve 42 via output driver 56. After waiting a nominal period of time within the range of approximately 1–5 sec., to allow the piston 34 to reach the end of the fluid chamber 30, the valve 36 is opened to achieve gas flow equilibrium between the gas chamber 26 and gas chamber 32. The pressure controller 70 accomplishes this by issuing a valve command to the valve 36 via output driver 54 that causes the valve 36 to open. The position of the piston 28 is adjusted via the valve 16 until the desired pressure in the gas chamber 32 of the second accumulator 22 is achieved. In particular, the pressure controller 70 issues a valve command to the valve 16 via the output driver 52. The pressure controller 70 monitors the gas pressure in the gas chamber 32 of the second accumulator 22. When the pressure signal from the gas chamber 32 equals the desired precharge pressure, the pressure controller 70 issues a valve command to the valve 36 via the output driver 54. This locks the desired precharge pressure in the gas chamber 32 of the second accumulator 22. The fluid chamber 30 of the second accumulator 22 is reconnected to the hydraulic load holding circuit 14 and is closed from the tank 40. In particular, the pressure controller 70 issues a valve command to the valve 42 via output driver 56 to control the valve 42. The advantage of this arrangement is that there is no need to monitor the position of either piston 28 or piston 34, and, therefore, there is no need for a rod and associated linkage to be connected to either piston 28, 34. Moreover, the need for piston position sensors is eliminated.

As shown in FIGS. 1–3, the microprocessor 50 may also preferably include a conventional weigh-load module 80 for measuring and recording the weight of an object or material carried by the loader vehicle. The information generated by the weigh-load module 80 may preferably be displayed on a conventional display device 82 such as, for example, a liquid crystal display located on the control console of the loader vehicle. There are several benefits associated with determining the weight of an object or material carried by the loader vehicle. For example, the operator can determine the weight of material being loaded into a truck to ensure the truck does not exceed its maximum weight capacity. Moreover, the operator can confirm and ensure that the loader vehicle is operating within safe operating limits.

The weigh-load module 80 may provide an accurate (typically within 1%–2%) measurement and recording of the weight of the material or object carried by the loader vehicle. Two pressure sensors may be used (one on each side of the conventional lift cylinders of the hydraulic loading circuit 14) to determine the pressure on the hydraulic load holding circuit 14 caused by the load 15. Since loader vehicle kinematics dictate that the force required to hold a given amount of weight varies with the position of a load carrying structure (such as, for example, a loader arm), a means to measure the position of the load carrying structure may also preferably be included. The position of the load carrying structure may be determined by use of a proximity switch which would require the load carrying structure to pass the switch before a measurement or recording could be made. Alternatively, a continuous position sensor such as, for example, a rotary potentiometer may be used to allow the measurement of the weight at any position of the load carrying structure. In operation, the operator may, for example, lift an object or material to a predetermined nominal height. The operator may then depress a button on the console of the loader vehicle which records the pressure on the hydraulic load holding circuit 14. The weigh-load module 80 then converts the pressure into an equivalent weight of the object or material carried by the loader vehicle, and displays the data on a display device 82.

The advantage of the embodiments shown in FIGS. 1–3 is that the gas charge in the gas chamber 32 of the second accumulator 22 will automatically be adjusted to a precharge pressure which provides the optimum shock absorption for the specific load 15 on the hydraulic load holding circuit 14. As a result, the apparatus 10 will provide the same degree of ride improvement regardless of the load 15 being carried. This results in a smoother ride for the operator and reduces wear and tear on the loader vehicle. Moreover, with respect to wheel loaders, skid steer loaders, and backhoe loaders, for example, the apparatus 10 may prevent spillage of an object or material carried in a bucket. With respect to fork lift machines, for example, the apparatus 10 may prevent the object or material carried by the forks from being damaged or dropped.

FIGS. 1–3 illustrate an example of an accumulator assembly 12 having two accumulators 20, 22 connected back-to-back. It is contemplated that a wide variety of other configurations may be utilized to perform the same function as the accumulator assembly 12 disclosed in FIGS. 1–3. Also, other combinations of pressure and piston position data may be used to control the precharge pressure.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. An apparatus for adjusting the ride of a load carrying vehicle comprising:
   a sensor that measures a load on a load holding hydraulic circuit and a controller operatively connected to an adjustable accumulator assembly, the controller capable of adjusting a precharge pressure in the accumulator in response to the load measured by the sensor, wherein the sensor is operatively connected between the hydraulic load holding circuit and the controller.

2. The apparatus of claim 1 wherein the accumulator assembly includes a first accumulator operatively connected to a second accumulator, the hydraulic load holding circuit operatively connected to the second accumulator, a first valve operatively connected to the first accumulator.

3. The apparatus of claim 2 wherein the first and second accumulators each include a gas chamber, a fluid chamber, and a piston that separates the gas chamber and the fluid chamber.

4. The apparatus of claim 3 further comprising a second valve operatively connected between the gas chamber of the first accumulator and the gas chamber of the second accumulator.

5. The apparatus of claim 4 further comprising a third valve operatively connected between the fluid chamber of the second accumulator and the hydraulic load holding circuit.

6. The apparatus of claim 5 wherein the third valve is operatively connected to a tank.

7. The apparatus of claim 3 wherein the first valve is operatively connected between the fluid chamber of the first accumulator and the controller.

8. The apparatus of claim 7 wherein the first valve is operatively connected to a pump.

9. The apparatus of claim 7 wherein the first valve is operatively connected to a tank.

10. The apparatus of claim 3 further comprising a second sensor operatively connected between the gas chamber of the second accumulator and the controller for sensing the pressure in the gas chamber of the second accumulator.

11. The apparatus of claim 3 further comprising a first piston position sensor operatively connected between the piston of the first accumulator and the controller to sense the position of the piston of the first accumulator.

12. The apparatus of claim 11 further comprising a second piston position sensor operatively connected between the piston of the second accumulator and the controller to sense the position of the piston of the second accumulator.

13. The apparatus of claim 2 wherein the controller includes a microprocessor, at least one output driver connected to the first valve, and at least one analog-to-digital converter.

14. The apparatus of claim 13 wherein the microprocessor includes a precharge pressure controller and at least one filter.

15. The apparatus of claim 14 wherein the microprocessor includes a weigh-load module operatively connected to the hydraulic load holding circuit for measuring and recording the weight of an object or material carried by the loader vehicle.

16. The apparatus of claim 15 comprising a display device operatively connected to the weigh-load module.

17. A method for adjusting the ride of a loader vehicle comprising:
   providing an adjustable accumulator assembly having a pressure operatively connected to hydraulic load holding, circuit, and a controller operatively connected to the accumulator assembly,
   determining a load on the hydraulic load holding circuit;
   adjusting the number of gas molecules in the adjustable accumulator assembly to a level which is optimum for the load,
   providing a weigh-load module operatively connected to the hydraulic load holding circuit; and
   determining the weight of an object or material carried by the loader vehicle.

18. A method for adjusting the ride of a loader vehicle comprising:
   providing an accumulator assembly including a first accumulator operatively connected to a second accumulator by a valve, the first and second accumulators each including a gas chamber, a fluid chamber, and a piston that separates that gas chamber and the fluid chamber, a hydraulic load holding circuit operatively connected to the second accumulator;
   sensing pressure on the hydraulic load holding circuit;
   determining a load on the hydraulic load holding circuit from the sensed pressure;
   determining a desired precharge pressure for the gas chamber of the second accumulator;
   determining a desired number of gas molecules for the gas chamber of the second accumulator;
   isolating the hydraulic load holding circuit from the fluid chamber of the second accumulator;
   opening the valve;
   determining the position of the piston of the first accumulator and the position of the piston of the second accumulator;
   determining a desired position of the piston of the first accumulator which is optimum for the load on the hydraulic load holding circuit, adjusting the position of the piston of the first accumulator until the desired position is reached;

closing the valve; and connecting the hydraulic load holding circuit to the fluid chamber of the second accumulator.

19. The method of claim 18 further comprising:

sensing the position of the piston of the first accumulator and the position of the piston of the second accumulator; and monitoring the position of the piston of the first accumulator and the position of the piston of the second accumulator.

20. A method for controlling the ride of a loader vehicle comprising:

providing an accumulator assembly including a first accumulator operatively connected to a second accumulator by a valve, the first and second accumulators each including a gas chamber, a fluid chamber, and a piston that separates that gas chamber and the fluid chamber, a hydraulic load holding circuit operatively connected to the second accumulator;

sensing pressure on the hydraulic load holding circuit;

determining a load on the hydraulic load holding circuit from the sensed pressure;

determining a desired precharge pressure for the gas chamber of the second accumulator;

determining a desired number of gas molecules for the gas chamber of the second accumulator;

isolating the hydraulic load holding circuit from the fluid chamber of the second accumulator;

opening the valve;

determining the position of the piston of the first accumulator;

determining the pressure in the gas chamber of the second accumulator;

determining the position of the piston of the second accumulator;

determining a desired position of the piston of the first accumulator which is optimum for the load on the hydraulic load holding circuit;

adjusting the position of the piston of the first accumulator until the desired position is reached;

closing the valve; and connecting the hydraulic load holding circuit to the fluid chamber of the second accumulator.

21. A method for controlling the ride of a loader vehicle comprising:

providing an accumulator assembly including a first accumulator operatively connected to a second accumulator by a valve, the first and second accumulators each including a gas chamber, a fluid chamber, and a piston that separates that gas chamber and the fluid chamber, a hydraulic load holding circuit operatively connected to the second accumulator;

sensing pressure on a hydraulic load holding circuit;

determining a load on the hydraulic load holding circuit from the sensed pressure;

determining a desired precharge pressure for the gas chamber of the second accumulator;

isolating the hydraulic load holding circuit from the fluid chamber of the second accumulator;

opening the fluid chamber of the second accumulator to a tank;

opening the valve and waiting predetermined time;

adjusting the position of the piston of the first accumulator until the desired pressure in the gas chamber of the second accumulator is reached;

closing the valve;

connecting the hydraulic holding circuit to fluid chamber of the second accumulator; and preventing fluid from flowing between the fluid chamber of the second accumulator and the tank.

22. The method of claim 21 further comprising:

measuring the pressure in the gas chamber of the second accumulator; and monitoring the pressure in the gas chamber of the second accumulator.

* * * * *